(12) United States Patent
Lin et al.

(10) Patent No.: US 11,641,582 B2
(45) Date of Patent: May 2, 2023

(54) ACCOUNT REGISTRATION METHOD IN DECT NETWORK CLUSTER SYSTEM

(71) Applicant: YEALINK (XIAMEN) NETWORK TECHNOLOGY CO., LTD., Fujian (CN)

(72) Inventors: Yanzhang Lin, Fujian (CN); Lianchang Zhang, Fujian (CN); Wanjian Feng, Fujian (CN)

(73) Assignee: YEALINK (XIAMEN) NETWORK TECHNOLOGY CO., LTD., Xiamen (CN)

( * ) Notice: Subject to any disclaimer, the term of this patent is extended or adjusted under 35 U.S.C. 154(b) by 143 days.

(21) Appl. No.: 17/151,096

(22) Filed: Jan. 15, 2021

(65) Prior Publication Data

US 2021/0219135 A1 Jul. 15, 2021

(30) Foreign Application Priority Data

Jan. 15, 2020 (CN) .......................... 202010042793.9

(51) Int. Cl.
| | |
|---|---|
| *H04W 12/08* | (2021.01) |
| *H04W 76/10* | (2018.01) |
| *H04L 12/18* | (2006.01) |
| *H04L 9/40* | (2022.01) |
| *H04L 67/30* | (2022.01) |
| *H04L 65/1104* | (2022.01) |

(52) U.S. Cl.
CPC ........... *H04W 12/08* (2013.01); *H04L 12/189* (2013.01); *H04L 63/083* (2013.01); *H04L 63/102* (2013.01); *H04L 65/1104* (2022.05); *H04L 67/30* (2013.01); *H04W 76/10* (2018.02)

(58) Field of Classification Search
CPC ....................... H04L 65/1104; H04M 2250/08
See application file for complete search history.

(56) References Cited

U.S. PATENT DOCUMENTS

| | | | | |
|---|---|---|---|---|
| 2007/0280252 | A1* | 12/2007 | Chuang ............... | H04L 65/1045 370/395.2 |
| 2009/0285200 | A1* | 11/2009 | Dekeyser .............. | H04M 1/725 709/228 |
| 2012/0023238 | A1* | 1/2012 | Bouthemy ............ | H04L 65/103 709/227 |
| 2012/0275450 | A1* | 11/2012 | Connelly ............ | H04M 7/0069 370/352 |

(Continued)

*Primary Examiner* — Douglas B Blair

(57) ABSTRACT

An account registration method in a Digital Enhanced Cordless Telecommunications (DECT) network cluster system includes: establishing communication with a DECT host through a DECT network cluster constructed in advance; receiving first account information allocated by the DECT host; initiating registration to a server according to the first account information, and obtaining a first registration result; sending the first registration result to the DECT host; if the first registration result is that the registration is successful, entering a first mode; if the first registration result is that the registration is not responded to, obtaining a second registration result fed back by the DECT host; if the second registration result is that the registration is successful, entering a second mode, where in the second mode, the DECT device sends SIP signaling to the DECT host so that the DECT host forwards the SIP signaling.

5 Claims, 4 Drawing Sheets

(56) References Cited

U.S. PATENT DOCUMENTS

| | | | |
|---|---|---|---|
| 2014/0094170 A1* | 4/2014 | Kilian ................... | H04M 1/727 |
| | | | 455/435.1 |
| 2014/0118463 A1* | 5/2014 | Lu .......................... | H04N 7/148 |
| | | | 348/14.02 |
| 2019/0215729 A1* | 7/2019 | Oyman ............... | H04L 65/1016 |

* cited by examiner

ACCOUNT REGISTRATION METHOD IN DECT NETWORK CLUSTER SYSTEM

CROSS-REFERENCE TO RELATED APPLICATIONS

The present application claims the benefit of Chinese Patent Application No. 202010042793.9 filed on Jan. 15, 2020, the contents of which are hereby incorporated by reference.

TECHNICAL FIELD

The present disclosure relates to an account registration method, and in particular, to an account registration method in a Digital Enhanced Cordless Telecommunications (DECT) network cluster system.

BACKGROUND

The DECT has limited wireless coverage, and a handle is incapable of communication once leaving the wireless coverage of an original Base. Therefore, a DECT cluster emerges. In the cluster system, a DM device generally has higher network privileges (such as a network white list), so that the DM (which is also referred to as a DECT host in this specification) can register with a public network server. A Base (which is also referred to as a DECT device in this specification) in the cluster system only needs to interact with the DM. Therefore, the Base generally does not need to have high-level network privileges, so the Base is not always capable of accessing an external network.

Therefore, considering the success rate of registration and the smoothness of SIP signaling transmission, account registration may be performed by the DM, and SIP signaling of the Base may be forwarded by the DM. However, the disadvantage lies that, if account registration is performed by the DM and SIP signaling of the Base is processed and forwarded by the DM, data processing load of the DM is increased and the efficiency of data transmission is reduced.

SUMMARY

To solve at least one of the foregoing technical problems, the present disclosure provides an account registration method in a DECT network cluster system, to improve the efficiency of data transmission.

To achieve the above objective, one aspect of the present disclosure provides an account registration method in a DECT network cluster system. The method includes:

establishing communication with a DECT host through a DECT network cluster constructed in advance;

receiving first account information allocated by the DECT host, where an account status of the first account information is registration snooping;

initiating registration to a server according to the first account information, and obtaining a first registration result of a first account;

sending the first registration result to the DECT host;

if the first registration result is that the registration is successful, entering a first mode, where in the first mode, a DECT device directly initiates SIP signaling to the server;

if the first registration result is that the registration is not responded to, obtaining a second registration result fed back by the DECT host, where the second registration result is the second registration result of the first account after the DECT host initiates registration to the server according to the first account information; and if the second registration result is that the registration is successful, entering a second mode, where in the second mode, the DECT device sends SIP signaling to the DECT host so that the DECT host forwards the SIP signaling.

Optionally, the first account information includes an account name of the first account, an account password of the first account, and an address of the server.

Optionally, the initiating registration to a server according to the first account information, and obtaining a first registration result of a first account includes:

sending a registration request of the first account to the server; and waiting for a first registration status signal of the first account fed back by the server, where if the first registration status signal is received within first preset duration and the first registration status signal is a registration success signal, the obtained first registration result of the first account is that the registration is successful; or if the first registration status signal is not received within first preset duration, the obtained first registration result of the first account is that the registration is not responded to.

Optionally, the initiating registration to a server according to the first account information, and obtaining a first registration result of a first account further includes:

if the first registration status signal is received within the first preset duration and the first registration status signal is a registration failure signal, re-initiating registration to the server according to the first account information after second preset duration.

Optionally, the method further includes constructing the DECT network cluster, where the constructing the DECT network cluster includes:

after the DECT host sends, to a router, a multicast command that declares joining a specified multicast group, sending, to the router, a multicast snooping message sent to a target multicast group, so that the router sends, to the DECT host according to the multicast command, the multicast snooping message of which the target multicast group is the specified multicast group;

receiving status declaration information sent by the DECT host according to the multicast snooping message in a peer-to-peer manner after the DECT host receives the multicast snooping message, and initiating a Transmission Control Protocol (TCP) connection request to the DECT host in a peer-to-peer manner according to the status declaration information; and after the DECT host receives the connection request, establishing a TCP channel with the DECT host.

To achieve the above objective, another aspect of the present disclosure provides an account registration method in a DECT network cluster system. The method includes:

establishing communication with a DECT device through a DECT network cluster constructed in advance;

allocating first account information to the DECT device, so that the DECT device initiates registration to a server according to the first account information, where an account status of the first account information is registration snooping;

receiving a first registration result of the registration initiated by the DECT device to the server according to the first account information;

if the first registration result is that the registration is not responded to, initiating registration to the server according to the first account information, and obtaining a second registration result of a first account; and if the second registration result is that the registration is successful, sending the second registration result to the DECT device, and entering a second mode, where in the second mode, a DECT host receives and forwards SIP signaling sent by the DECT device.

Optionally, the first account information includes an account name of the first account, an account password of the first account, and an address of the server.

Optionally, the initiating registration to the server according to the first account information, and obtaining a second registration result of a first account includes:

sending a registration request of the first account to the server; and waiting for a second registration status signal of the first account fed back by the server, where if the second registration status signal is received within third preset duration and the second registration status signal is a registration success signal, the obtained second registration result of the first account is that the registration is successful; or if a second registration status signal is not received within the third preset duration, an obtained second registration result of the first account is that the registration is not responded to.

Optionally, the initiating registration to the server according to the first account information, and obtaining a second registration result of a first account further includes:

if the second registration status signal is received within the third preset duration and the second registration status signal is a registration failure signal, re-initiating registration to the server according to the first account information after fourth preset duration.

Optionally, the method further includes constructing the DECT network cluster, where the constructing the DECT network cluster includes:

sending, to a router, a multicast command that declares joining a specified multicast group;

receiving a multicast snooping message which is fed back by the router and of which a target multicast group is the specified multicast group;

sending status declaration information to the DECT device according to the multicast snooping message;

receiving a Transmission Control Protocol (TCP) connection request initiated by the DECT device according to the status declaration information; and establishing a TCP channel with the DECT device according to the connection request.

Compared with the prior art, the present disclosure has the following beneficial effects:

According to the account registration method in a DECT network cluster system provided in the present disclosure, a DECT device first registers with a server, and when a first registration result of the registration initiated by the DECT device to the server is that the registration is not responded to, a DECT host initiates registration to the server; it is determined whether to enter a first mode or a second mode based on the first registration result and a second registration result of the registration initiated by the DECT host to the server. In the first mode, SIP signaling of the DECT device does not need to be forwarded by the DECT host, thus improving the efficiency of data transmission. In the second mode, SIP signaling of the DECT device is forwarded by the DECT host, to ensure that the SIP signaling can be sent normally. According to the present registration method, different registration bodies can be selected according to different network privileges of the DECT device, to ensure the success rate of the registration. Moreover, the efficiency of data transmission is improved while normal transmission of SIP signaling of the DECT device is ensured, and the data processing load of the DECT host is reduced.

BRIEF DESCRIPTION OF THE DRAWINGS

The accompanying drawings illustrate exemplary implementations of the present disclosure, and are intended to explain the principles of the present disclosure together with the description thereof. The accompanying drawings are included to provide a further understanding of the present disclosure, and are included in and constitute part of the specification.

DETAILED DESCRIPTION

The present disclosure is described in further detail below with reference to the accompanying drawings and implementations. It should be understood that the specific implementations described herein are merely intended to explain related content, rather than to limit the present disclosure. It should also be noted that, for convenience of description, only the parts related to the present disclosure are shown in the accompany drawings.

It should be noted that, in case of no conflict, the implementations in the present disclosure and the features in the implementations may be combined with each other. The present disclosure is described in detail below with reference to the accompanying drawings and implementations.

DECT: Digital Enhanced Cordless Telecommunications.

DECT clustering: all devices with a DECT service are associated in terms of services, to communicate with each other.

Base: a DECT device with a Voice over Internet Protocol (VOIP) service (which may be construed as a Mini base station similar to a cell phone), also referred to as a DECT device in this application.

DM: a host that performs service clustering on all Bases in a local area network, also referred to as a DECT host in this application.

SIP: Session Initiation Protocol, which is a multimedia communications protocol formulated by the Internet Engineering Task Force (IETF).

Figure 1:
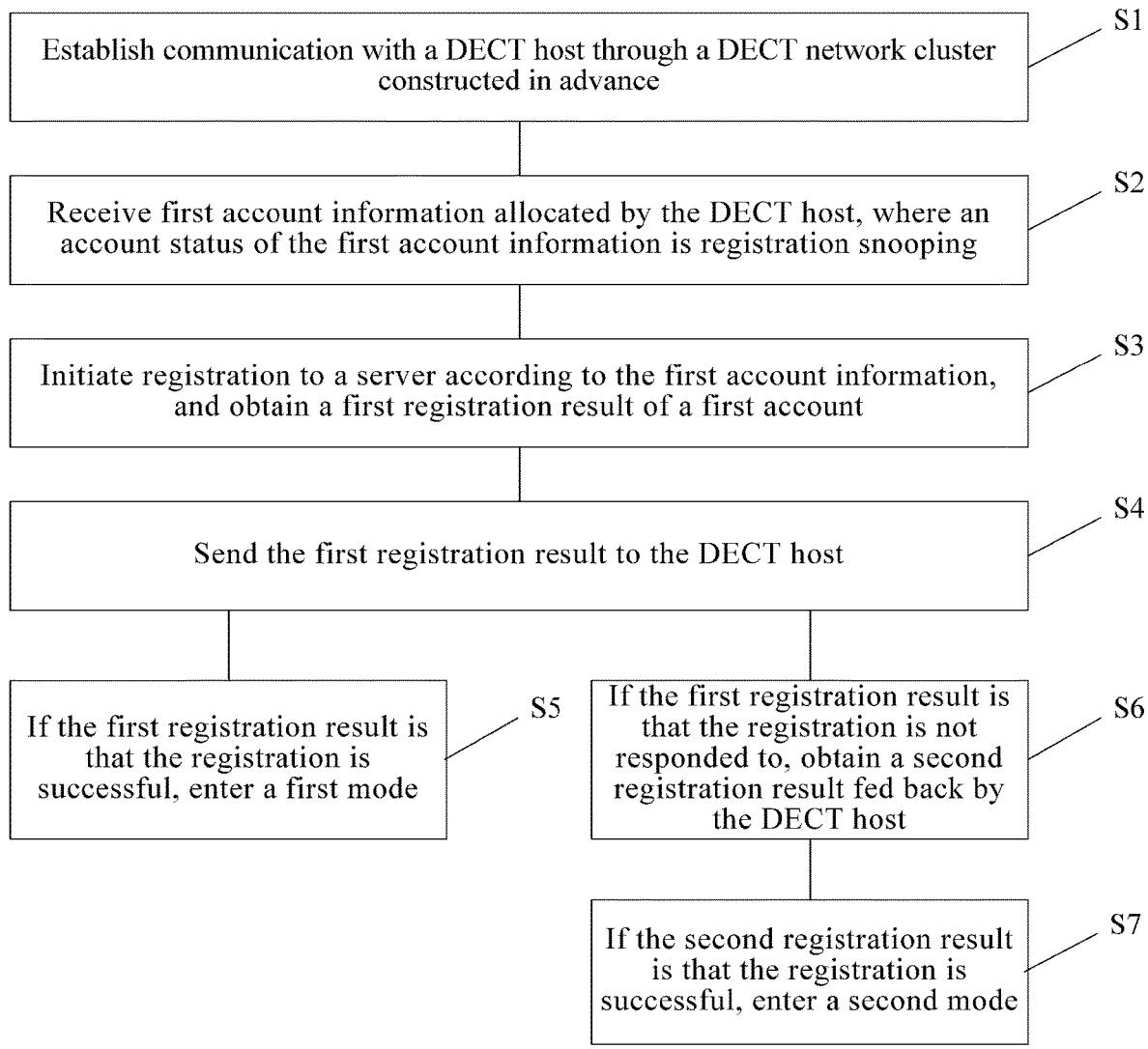
FIG. 1 is a flowchart of an implementation of an account registration method in a DECT network cluster system according to the present disclosure.

Referring to FIG. 1, FIG. 1 is a flowchart of an implementation of an account registration method in a DECT network cluster system according to the present disclosure.

An account registration method in a DECT network cluster system includes the following steps:

Step S1: establish communication with a DECT host through a DECT network cluster constructed in advance.

Step S2: receive first account information allocated by the DECT host, where an account status of the first account information is registration snooping.

Step S3: initiate registration to a server according to the first account information, and obtain a first registration result of a first account.

Step S4: send the first registration result to the DECT host.

Step S5: if the first registration result is that the registration is successful, enter a first mode, where in the first mode, a DECT device directly initiates SIP signaling to the server.

Step S6: if the first registration result is that the registration is not responded to, obtain a second registration result fed back by the DECT host, where the second registration result is the second registration result of the first account after the DECT host initiates registration to the server according to the first account information.

Step S7: if the second registration result is that the registration is successful, enter a second mode, where in the second mode, the DECT device sends SIP signaling to the DECT host so that the DECT host forwards the SIP signaling.

The foregoing steps are performed by the DECT device. The DECT device initiates registration to the server according to the first account information, and enters the first mode if the registration is successful; if the registration is not responded to, the DECT device enters the second mode when the DECT host initiates registration to the server according to the first account information and the registration is successful.

According to the technical solution in the present disclosure, the DECT device first registers with the server, and when the first registration result of the registration initiated by the DECT device to the server is that the registration is not responded to, the DECT host initiates registration to the server; it is determined whether to enter the first mode or the second mode based on the first registration result and the second registration result of the registration initiated by the DECT host to the server. In the first mode, SIP signaling of the DECT device does not need to be forwarded by the DECT host, thus improving the efficiency of data transmission. In the second mode, SIP signaling of the DECT device is forwarded by the DECT host, to ensure that the SIP signaling can be sent normally. According to the present registration method, different registration bodies can be selected according to different network privileges of the DECT device, to ensure the success rate of the registration. Moreover, the efficiency of data transmission is improved while normal transmission of SIP signaling of the DECT device is ensured, and the data processing load of the DECT host is reduced.

It should be noted that:

The first mode is distributed registration, which means that the account is registered on the DECT device (Base), the DECT device (Base) needs to initiate signaling such as call/subscription, and the SIP signaling is directly initiated on the DECT device (Base). The SIP signaling is directly initiated on the DECT device (Base), so the transmission speed is faster.

The second mode is centralized registration, which means that the account is registered on the DECT host (DM). The DECT device (Base) only records information of the account. If the DECT device (Base) initiates signaling such as call/subscription, SIP signaling needs to be initiated on the DECT host (DM).

As can be learned, the main purpose of the DECT host or DECT device initiating registration to the server is to declare location (network) information to the server. Other SIP processes, such as call/subscription, can be initiated only after the terminal is successfully registered.

In the foregoing implementation, the first account information may include an account name of the first account: Username, an account password of the first account: Passwd, and an address of the server: ServerAddress, and may further include other registration information such as a display name: DisplayName. The address of the server may be an IP address.

As an optional scheme of the foregoing implementation, the step of initiating registration to a server according to the first account information, and obtaining a first registration result of a first account includes:

sending a registration request of the first account to the server; and waiting for a first registration status signal of the first account fed back by the server, where if the first registration status signal is received within first preset duration and the first registration status signal is a registration success signal, the obtained first registration result of the first account is that the registration is successful; or if the first registration status signal is not received within first preset duration, the obtained first registration result of the first account is that the registration is not responded to.

As an optional scheme of the foregoing implementation, the step of initiating registration to a server according to the first account information, and obtaining a first registration result of a first account further includes:

if the first registration status signal is received within the first preset duration and the first registration status signal is a registration failure signal, re-initiating registration to the server according to the first account information after second preset duration.

Figure 2:
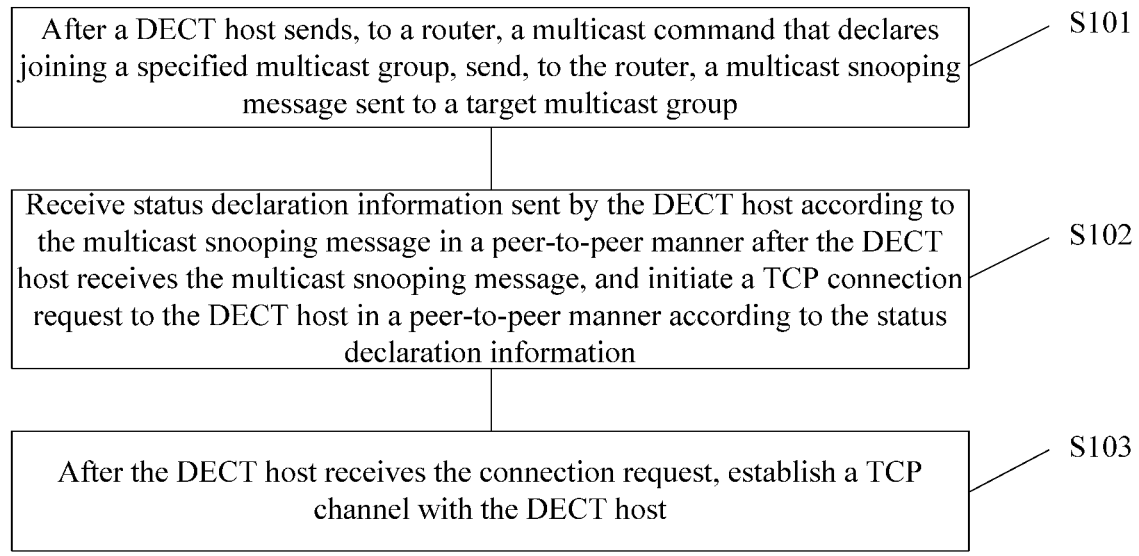
FIG. 2 is a flowchart of an implementation of a method for constructing a DECT network cluster according the present disclosure.

Referring to FIG. 2, FIG. 2 is a flowchart of an implementation of a method for constructing a DECT network cluster according the present disclosure.

The account registration method in a DECT network cluster system further includes constructing the DECT network cluster, which includes the following steps:

Step S101: after the DECT host sends, to a router, a multicast command that declares joining a specified multicast group, send, to the router, a multicast snooping message sent to a target multicast group, so that the router sends, to the DECT host according to the multicast command, the multicast snooping message of which the target multicast group is the specified multicast group.

Step S102: receive status declaration information sent by the DECT host according to the multicast snooping message in a peer-to-peer manner after the DECT host receives the multicast snooping message, and initiate a Transmission Control Protocol (TCP) connection request to the DECT host in a peer-to-peer manner according to the status declaration information.

Step S103: after the DECT host receives the connection request, establish a TCP channel with the DECT host.

It should be noted that, the message used in this implementation is a multicast snooping message sent to the target multicast group; moreover, the specified multicast group may be expressed by using a multicast address, such as 224.2.10.10.

The multicast snooping message includes address information of the Base, such as a Media Access Control (MAC) address of the Base, so that the DECT host can send the status declaration information to the Base according to the multicast snooping message. The status declaration information no longer needs to be sent through a multicast protocol, thus reducing impact on the network bandwidth.

In step S102, the DECT host receives the multicast snooping message and sends the status declaration information to the Base according to the multicast snooping message; the Base receives the status declaration information, and initiates the TCP protocol connection request to the DECT host according to the status declaration information. The DECT host sends the status declaration information to the corresponding Base according to address information contained in the multicast snooping message. The Base determines a DECT host address according to the status declaration information, so as to initiate the TCP protocol connection request to the corresponding DECT host according to the status declaration information. In the status declaration information, information used by the Base to determine the DECT host address may be an IP address and a TCP listening port of the DECT host. The status declaration information may further include a MAC address of the DECT host.

By repeating steps S101 to S103, the DECT host and other Bases in a local area network may establish TCP channels, thereby implementing clustering of a DECT network and improving DECT experience.

According to the method in the present disclosure, the multicast snooping message is a multicast message, which adopts multicast protocol communication, and broadcasting is not required, thereby reducing a bandwidth requirement. Moreover, step S102 to step S103 adopt peer-to-peer interaction instead of multicast protocol communication, thus further reducing impact on the network bandwidth.

As can be learned, the step of establishing a TCP channel with the Base by the DECT host includes returning a connection acknowledgment request to the Base. The TCP channel may be established through three handshakes, and details are not described in the present disclosure.

Figure 3:
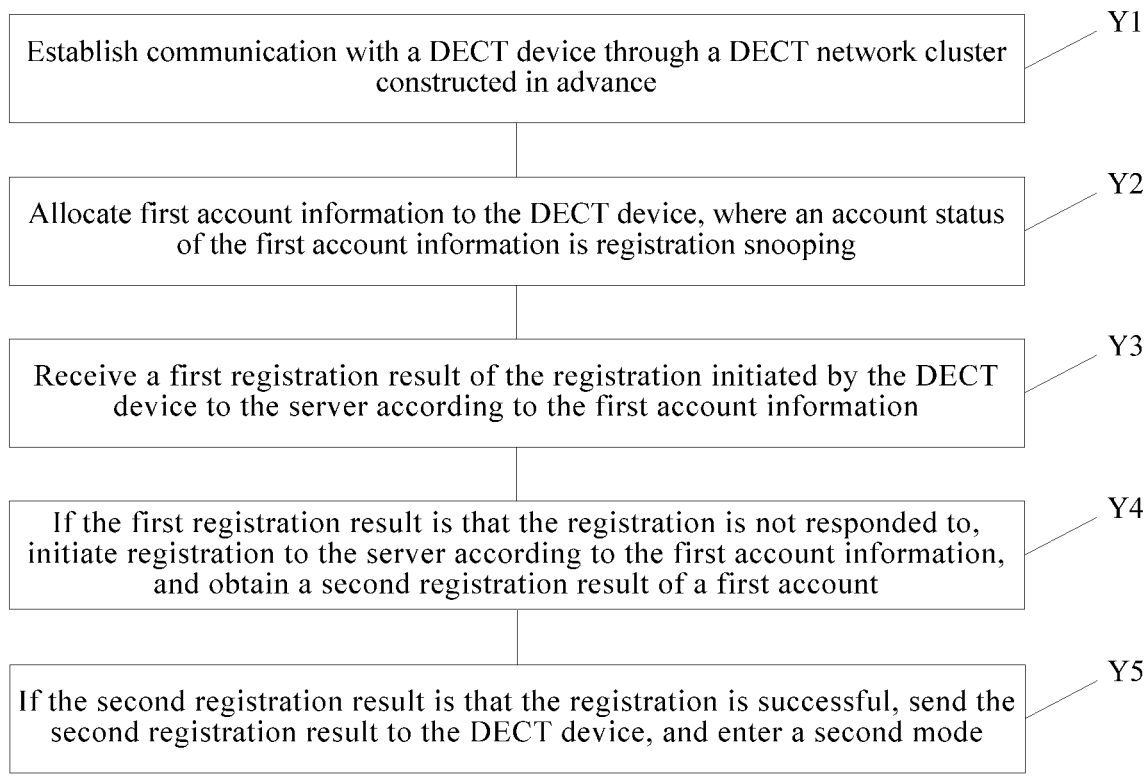
FIG. 3 is a flowchart of another implementation of an account registration method in a DECT network cluster system according the present disclosure.

As another embodiment of the present disclosure, referring to FIG. 3, FIG. 3 is a flowchart of an account registration method in a DECT network cluster system according to the present disclosure. The account registration method includes the following steps:

Step Y1: establish communication with a DECT device through a DECT network cluster constructed in advance.

Step Y2: allocate first account information to the DECT device, so that the DECT device initiates registration to a server according to the first account information, where an account status of the first account information is registration snooping.

Step Y3: receive a first registration result of the registration initiated by the DECT device to the server according to the first account information.

Step Y4: if the first registration result is that the registration is not responded to, initiate registration to the server according to the first account information, and obtain a second registration result of a first account.

Step Y5: if the second registration result is that the registration is successful, send the second registration result to the DECT device, and enter a second mode, where in the second mode, a DECT host receives and forwards SIP signaling sent by the DECT device.

The foregoing method is performed by the DECT host. The DECT host sends the first account information to the DECT device, so that the DECT device can register according to the first account information. If the registration is successful, the DECT device can send SIP signaling directly without forwarding by the DECT host; when the first registration result of the DECT device is that the registration is not responded to, it indicates that the DECT device has no network privilege. In this case, the DECT host receives and forwards the SIP signaling sent by the DECT device. Therefore, when the DECT device has no network privilege, the DECT host performs account registration and forwards SIP signaling for the DECT device without the network privilege. Transmission of data is ensured to be effective, and the efficiency of data transmission is improved.

In the foregoing implementation, the first account information may include an account name of the first account: Username, an account password of the first account: Passwd, and an address of the server: ServerAddress, and may further include other registration information such as a display name: DisplayName. The address of the server may be an IP address.

As an optional scheme of the foregoing implementation, the step of initiating registration to the server according to the first account information, and obtaining a second registration result of a first account includes:

sending a registration request of the first account to the server; and waiting for a second registration status signal of the first account fed back by the server, where if the second registration status signal is received within third preset duration and the second registration status signal is a registration success signal, the obtained second registration result of the first account is that the registration is successful; and if a second registration status signal is not received within the third preset duration, an obtained second registration result of the first account is that the registration is not responded to.

As an optional scheme of the foregoing implementation, the step of initiating registration to the server according to the first account information, and obtaining a second registration result of a first account further includes:

if the second registration status signal is received within the third preset duration and the second registration status signal is a registration failure signal, re-initiating registration to the server according to the first account information after fourth preset duration.

Figure 4:
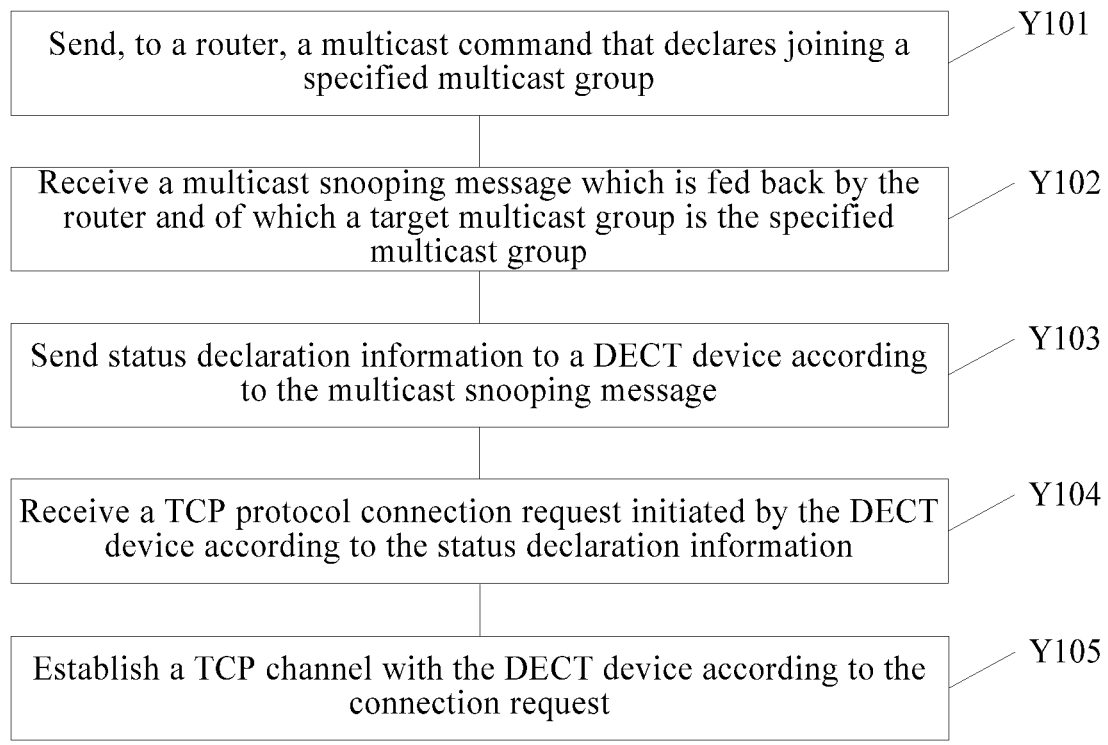
FIG. 4 is a flowchart of another implementation of a method for constructing a DECT network cluster according the present disclosure.

As an implementation, referring to FIG. 4, FIG. 4 is a flowchart of a method for constructing a DECT network cluster according to the present disclosure.

The account registration method in a DECT network cluster system further includes constructing the DECT network cluster, which includes the following steps:

Step Y101: send, to a router, a multicast command that declares joining a specified multicast group.

Step Y102: receive a multicast snooping message which is fed back by the router and of which a target multicast group is the specified multicast group.

Step Y103: send status declaration information to a DECT device according to the multicast snooping message.

Step Y104: receive a TCP protocol connection request initiated by the DECT device according to the status declaration information.

Step Y105: establish a TCP channel with the DECT device according to the connection request.

It should be noted that, the message used in the present disclosure is a multicast snooping message sent by the Base to the target multicast group; moreover, the specified multicast group may be expressed by using a multicast address, such as 224.2.10.10.

For the foregoing steps of constructing the DECT network cluster, reference may be made to the steps of constructing the DECT network cluster in FIG. 2. In FIG. 4, the steps of constructing the DECT network cluster are executed by the DECT host, and in FIG. 2, the steps of constructing the DECT network cluster are executed by the DECT device. The DECT host and the DECT device cooperate with each other to construct the DECT network cluster.

Description is made below by using a registration process of account A of Base_1 as an example.

Figure 5:
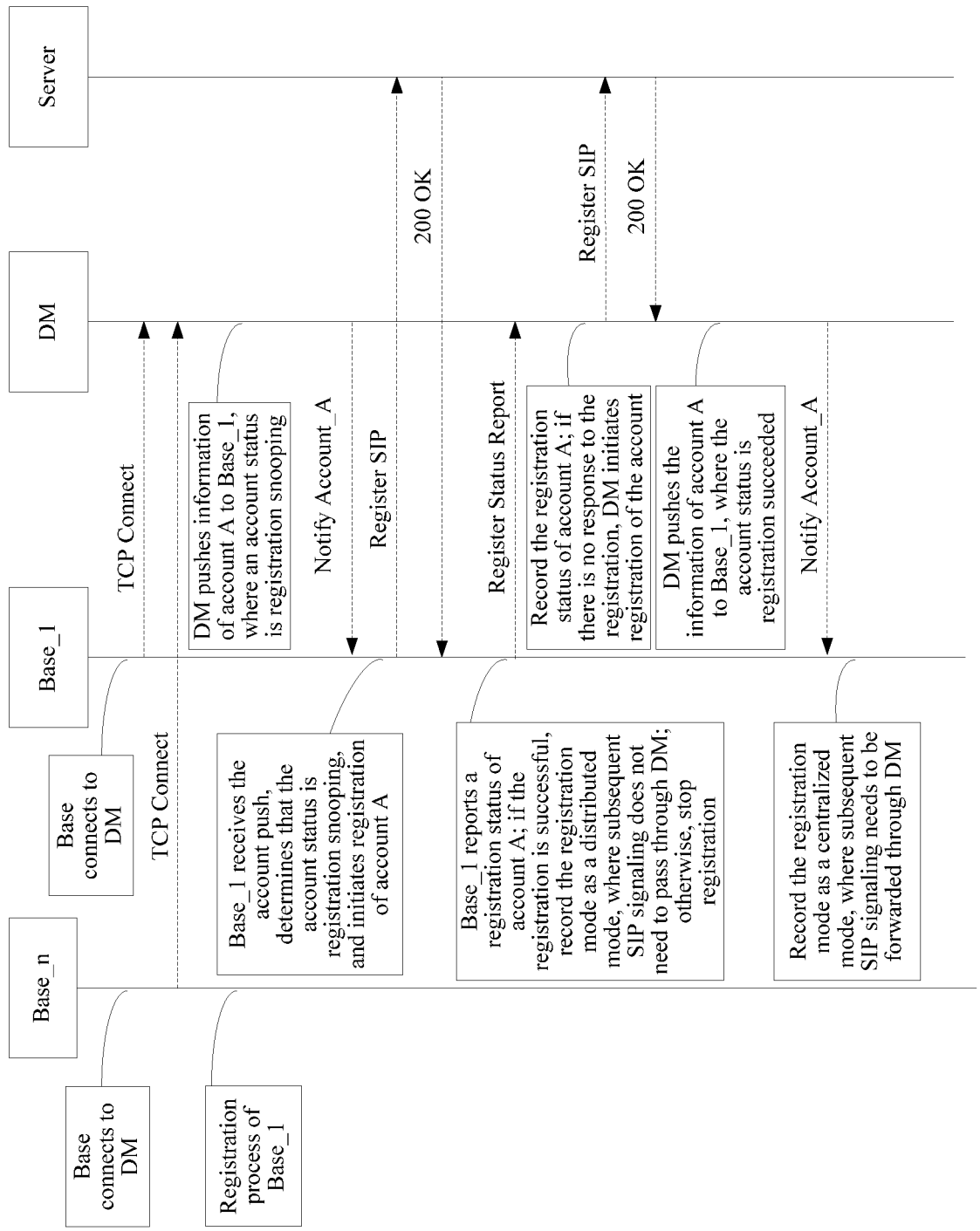
FIG. 5 is a diagram of a working principle of an embodiment of an account registration method in a DECT network cluster system according the present disclosure.

Referring to FIG. 5, FIG. 5 is a diagram of a working principle of an embodiment of an account registration method in a DECT network cluster system according to the present disclosure, which is specifically a diagram of a working principle using the registration process of account A of Base_1 as an example.

As shown in FIG. 5, an account registration method in a DECT network cluster system includes the following steps:

1. A Base connects to a DM. The Base connects to the DM by constructing a DECT network cluster. As shown in FIG. 2, Base_1 . . . Base_n establish a connection, namely, TCP Connect, with the DM.

The account registration process of Base_1 is taken as an example:

2. The DM pushes information of account A to Base_1: after the Base connects to the DM, the DM allocates the information of account A (Notify Account_A) to the Base, where an account status is "registration snooping"; the information of account A includes: DisPlayName/Username/Passwd/ServerAddress and other registration information.

3. Base_1 receives the account push and determines that the account status is "registration snooping", and therefore immediately initiates registration of account A (Register SIP) to the Server; as shown in FIG. 5, the Server feeds back 200CK, which means that the registration is successful.

4. Base_1 completes the registration snooping operation and reports the registration status of account A (register status report) to the DM, and the DM records the registration status of account A.

Base_1 and DM perform different processing according to the account registration situation:

A. The registration is successful: the Base and the DM mark the registration mode of the account as a distributed mode (that is, the first mode mentioned above), and the Base can directly send SIP signaling; in the distributed mode, subsequent SIP signaling does not need to pass through the DM.

B. The registration fails: the registration failure here refers to a registration failure for which the server has a corresponding error code, such as a password error or a server error. Base_1 re-initiates registration snooping according to a set time (for example, 30 s), and the DM continues to wait for the registration status.

C. The registration is not responded to: Base_1 stops registration snooping, and the DM initiates registration of the account (Register SIP).

5. Following step C above, the DM initiates account registration (register sip). Base_1 and DM perform different processing according to the account registration status:

a. The registration is successful: the DM pushes account A to Base_1 again, where the registration status is "registration successful", Base_1 and DM mark the registration mode of the account as a centralized mode (that is, the second mode mentioned above); when the Base initiates SIP signaling subsequently, the Base needs to notify the DM so that the DM carries out initiation.

b. The registration fails: the registration failure here refers to a registration failure for which the server has a corresponding error code, such as a password error or a server error; the DM re-initiates registration snooping according to a set time (for example, 30 s).

c. The registration is not responded to: in the case of no response to the registration, a processing mechanism of the DM is the same as that in step b.

Other Bases in the cluster system gradually complete registration according to steps 2 to 5, and finally, an account registration system in the cluster system is constructed.

In the description of this specification, the description of the terms "one embodiment/implementation", "some embodiments/implementations", "embodiment", "specific embodiment" or "some embodiments" means that the specific features, structures, materials or characteristics described with reference to the embodiment/implementation or embodiment are included in at least one embodiment/implementation or example of this application. In this specification, the illustrative expressions of the above terms are not intended to refer to the same embodiment/implementation or example. Moreover, the particular features, structures, materials or characteristics described may be combined in any suitable manner in any one or more embodiments/implementations or examples. In addition, those skilled in the art may combine different embodiments/implementations described herein or examples or features in different embodiments/implementations or examples without any contradiction.

Moreover, the terms such as "first" and "second" are used only for the purpose of description and cannot be understood as indicating or implying relative importance or implicitly indicating the number of technical features indicated. Therefore, features defined by "first" and "second" may explicitly or implicitly include at least one of the features. In description of the present disclosure, "a plurality of" means at least two, for example, two or three, unless otherwise clearly and specifically limited.

Those skilled in the art should understand that the foregoing implementations are merely intended to describe the present disclosure clearly, rather than to limit the scope of the present disclosure. Those skilled in the art may make other changes or modifications based on the foregoing disclosure, but these changes or modifications should fall within the scope of the present disclosure.

What is claimed is:

1. An account registration method in a Digital Enhanced Cordless Telecommunications (DECT) network cluster system, comprising:

establishing communication with a DECT host through a DECT network cluster constructed in advance;

receiving first account information allocated by the DECT host, wherein an account status of the first account information is registration snooping;

initiating registration to a server according to the first account information, and obtaining a first registration result of a first account;

sending the first registration result to the DECT host;

if the first registration result is that the registration is successful, entering a first mode, wherein in the first mode, a DECT device directly initiates SIP signaling to the server;

if the first registration result is that the registration is not responded to, obtaining a second registration result fed back by the DECT host, wherein the second registration result is the second registration result of the first account after the DECT host initiates registration to the server according to the first account information; and if the second registration result is that the registration is successful, entering a second mode, wherein in the second mode, the DECT device sends SIP signaling to the DECT host so that the DECT host forwards the SIP signaling.

2. The method according to claim 1, wherein the first account information comprises an account name of the first account, an account password of the first account, and an address of the server.

3. The method according to claim 1, wherein the initiating registration to a server according to the first account information, and obtaining a first registration result of a first account comprises:
   sending a registration request of the first account to the server; and
   waiting for a first registration status signal of the first account fed back by the server, wherein
   if the first registration status signal is received within first preset duration and the first registration status signal is a registration success signal, the obtained first registration result of the first account is that the registration is successful; or
   if the first registration status signal is not received within first preset duration, the obtained first registration result of the first account is that the registration is not responded to.

4. The method according to claim 3, wherein the initiating registration to a server according to the first account information, and obtaining a first registration result of a first account further comprises:
   if the first registration status signal is received within the first preset duration and the first registration status signal is a registration failure signal, re-initiating registration to the server according to the first account information after second preset duration.

5. The method according to claim 1, further comprising constructing the DECT network cluster, wherein the constructing the DECT network cluster comprises:
   after the DECT host sends, to a router, a multicast command that declares joining a specified multicast group, sending, to the router, a multicast snooping message sent to a target multicast group, so that the router sends, to the DECT host according to the multicast command, the multicast snooping message of which the target multicast group is the specified multicast group;
   receiving status declaration information sent by the DECT host according to the multicast snooping message in a peer-to-peer manner after the DECT host receives the multicast snooping message, and initiating a Transmission Control Protocol (TCP) connection request to the DECT host in a peer-to-peer manner according to the status declaration information; and
   after the DECT host receives the connection request, establishing a TCP channel with the DECT host.

\* \* \* \* \*